US012606258B2

(12) United States Patent
Ellmann et al.

(10) Patent No.: US 12,606,258 B2
(45) Date of Patent: Apr. 21, 2026

(54) TRACK JOINT ASSEMBLY RETAINER PLATE

(71) Applicant: Caterpillar Inc., Peoria, IL (US)

(72) Inventors: Thomas Ellmann, Groveland, IL (US); Brian Konrad Loeffler, Germantown Hills, IL (US); Jacob John Pitman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 329 days.

(21) Appl. No.: 18/334,746

(22) Filed: Jun. 14, 2023

(65) Prior Publication Data

US 2024/0417009 A1 Dec. 19, 2024

(51) Int. Cl.
B62D 55/21 (2006.01)
B62D 55/32 (2006.01)

(52) U.S. Cl.
CPC ............. B62D 55/21 (2013.01); B62D 55/32 (2013.01)

(58) Field of Classification Search
CPC ...... B62D 55/21; B62D 55/32; B62D 55/211; B62D 55/213
See application file for complete search history.

(56) References Cited

U.S. PATENT DOCUMENTS

| | | | | |
|---|---|---|---|---|
| 4,163,589 A | * | 8/1979 | Fox ...................... | B62D 55/205 |
| | | | | 305/59 |
| 4,288,172 A | | 9/1981 | Livesay et al. | |
| 5,069,509 A | * | 12/1991 | Johnson ............... | B62D 55/202 |
| | | | | 305/204 |
| 6,454,366 B1 | * | 9/2002 | Egle ...................... | B62D 55/21 |
| | | | | 305/105 |
| 11,565,761 B2 | | 1/2023 | Jones et al. | |
| 2008/0265667 A1 | * | 10/2008 | Livesay ................ | B62D 55/21 |
| | | | | 305/202 |
| 2013/0111733 A1 | | 5/2013 | Oertley et al. | |
| 2017/0050688 A1 | | 2/2017 | Oertley et al. | |
| 2020/0247489 A1 | * | 8/2020 | Jones ..................... | B62D 55/21 |

* cited by examiner

*Primary Examiner* — Kip T Kotter

(57) ABSTRACT

A track joint assembly may include a first track shoe including at least one forward pin lug, a second track shoe including at least one back pin lug, a pin extending through a pin bore coupling the first track shoe to the second track shoe, a retainer plate positioned within the pin bore and including an interior surface adjacent the pin, an exterior surface opposite the interior surface, and a recess extending at least partially along an outer circumferential edge of the exterior surface, a stop ring positioned within a stop groove formed in an inner circumferential surface of the pin bore, the stop ring positioned adjacent the exterior surface of the retainer and extending radially inward from the inner circumferential surface such that the stop ring blocks the retainer plate from withdrawing from the pin bore.

20 Claims, 8 Drawing Sheets

TRACK JOINT ASSEMBLY RETAINER PLATE

TECHNICAL FIELD

The present disclosure relates generally to a retainer plate, and more particularly, to a retainer plate for maintaining a pin in a track joint assembly.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be straight link chains with alternating inner and outer links, or can be offset link chains where all the links are alike.

As the links of the track chains translate, the links pivot about the pins that couple them together. As a result of the pivoting, friction forces exerted on the pins may cause the pins to walk out of the bores in which they are positioned, thereby allowing adjacent links to become decoupled. As links decouple, a track chain and a machine on which it is used may require maintenance. Decoupling may also lead to failure of the track chain, requiring a machine to cease operating and be serviced, and/or reducing a useful life of a track chain.

An exemplary track joint assembly utilizing a pin retainer is disclosed in U.S. Pat. No. 11,565,761 ("the '761 patent") to Jones et al. The '761 patent discloses that the pin retainer includes a retaining plate positioned in the pin bore next to the pin and a spring positioned next to the retaining plate to keep the retaining plate in place. The inventors of the present disclosure, however, have found that in such a configuration the spring frequently collapses, thereby allowing both the retaining plate and pin to walk out of the pin bore.

The retaining plate of the present disclosure may solve one or more of the problems set forth above and/or other problems in the art. The scope of the current disclosure, however, is defined by the attached claims, and not by the ability to solve any specific problem.

SUMMARY

In one aspect, a track joint assembly may include a first track shoe including at least one forward pin lug, a second track shoe including at least one back pin lug, a pin extending through a pin bore defined by the at least one forward pin lug and at least one back pin lug, coupling the first track shoe to the second track shoe, a retainer plate positioned within the pin bore and including an interior surface adjacent the pin, an exterior surface opposite the interior surface, and a recess extending at least partially along an outer circumferential edge of the exterior surface, a stop ring positioned within a stop groove formed in an inner circumferential surface of the pin bore, the stop ring positioned adjacent the exterior surface of the retainer and extending radially inward from the inner circumferential surface such that the stop ring blocks the retainer plate from withdrawing from the pin bore.

In another aspect, a retainer plate for a track joint assembly may include a planar first surface, a planar second surface opposite the first surface, an outer circumferential surface between the first surface and the second surface having a first diameter, and a recess extending at least partially along an outer circumferential edge of the first surface. The recess may define a stepped circumferential surface having a second diameter smaller than the first diameter.

In still another aspect, a kit for a track joint assembly may include a stop ring and a retainer plate having a planar first surface, a planar second surface opposite the first surface, an outer circumferential surface between the first surface and the second surface having a first diameter, and a recess extending at least partially along an outer circumferential edge of the first surface. The recess may define a stepped circumferential surface having a second diameter smaller than the first diameter and the stop ring may be dimensioned to nest within the recess.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about." "substantially," and "approximately" are used to indicate a possible variation of ±10% in the stated value.

Figure 1:
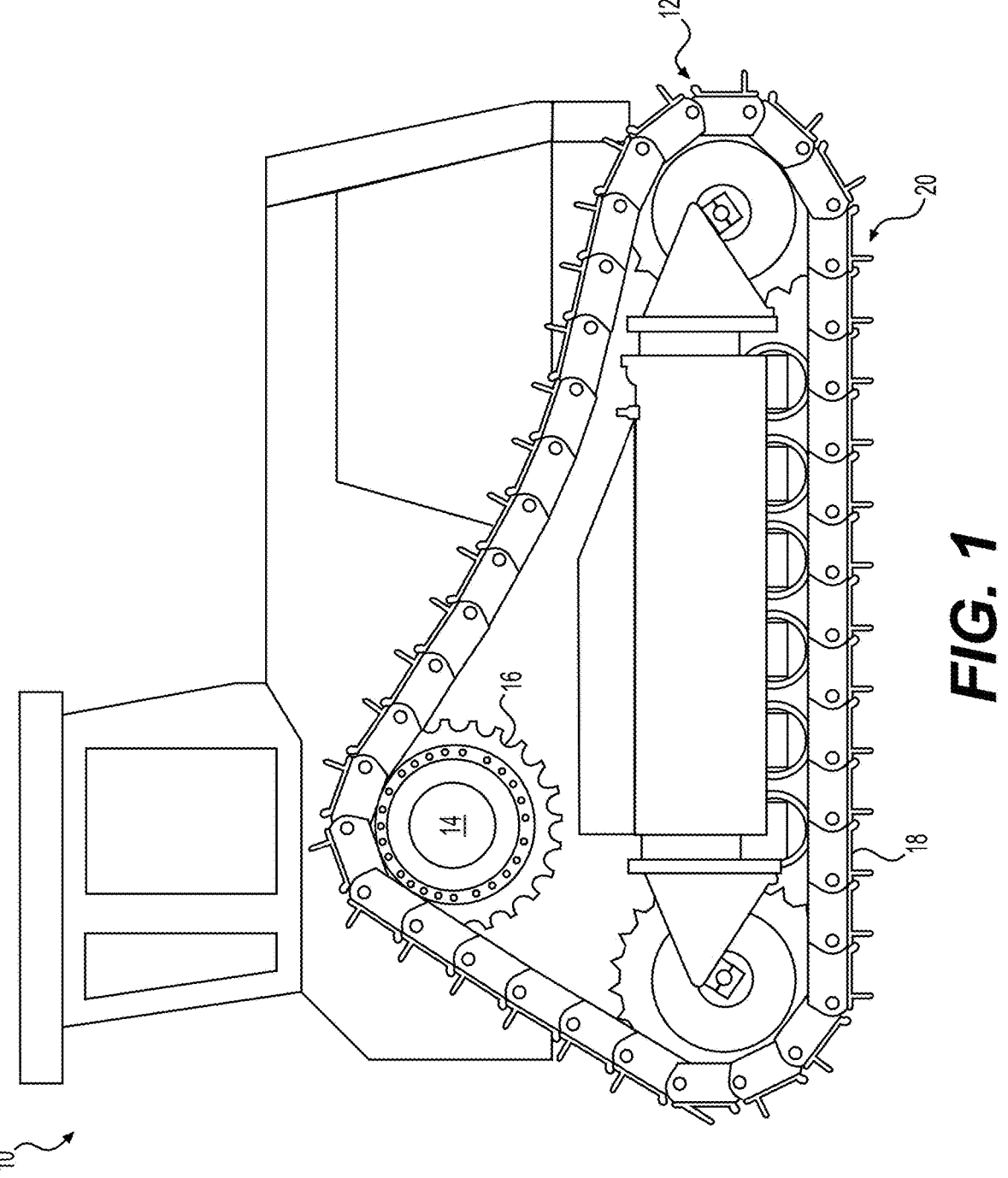
FIG. 1 is a perspective view of an exemplary machine having a track chain.

FIG. 1 illustrates a track-type machine 10 according to the present disclosure. Machine 10 may embody any machine that is driven, propelled, positioned, and/or maneuvered by operating a "continuous" track type traction device. Such machines may include, for example, track-type tractors, skid steers, dozers, excavators, track loaders, front shovels, rope shovels, or any other type of track-maneuverable machine. Machine 10 may include a pair of track assemblies 12 (only one shown) on opposing sides of machine 10 and driven by a driving mechanism 14, such as a machine engine or other power source (not shown) via at least one drive gear or sprocket 16. Each track assembly 12 may form separate endless loops. A plurality of track shoes 18 may be coupled to an outer surface of track assembly 12 in order to aid in the engagement of the ground surface. Track assembly 12 may include a plurality of other components that form the continuous track, ground-engaging portion of the drive system of machine 10. Track assembly 12 may be coupled to an undercarriage assembly 20 that includes, for example, sprocket 16, at least one idler, a plurality of rollers, and any other component of an undercarriage assembly known in the art. It will be understood that track assembly 12 is depicted in FIG. 1 with minimal detail for convenience of illustration and that components of track assembly 12 are shown and described in greater detail in the ensuing figures and the following description.

Figure 2:
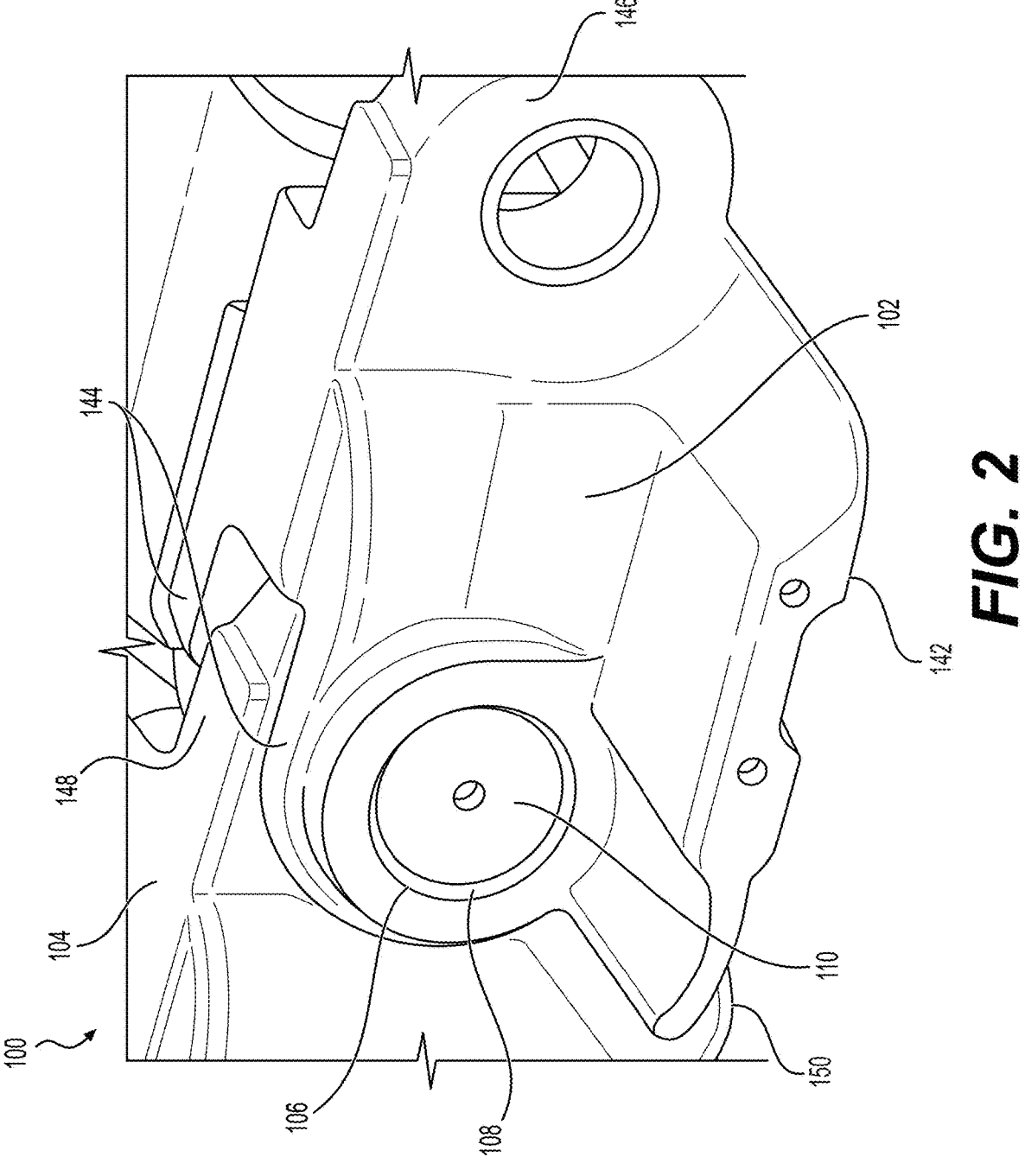
FIG. 2 is a perspective view of an exemplary track joint assembly.

Track assembly 12 may be a chain that includes multiple structurally similar track joint assemblies, each of which may include a pair of track shoes. FIG. 2 illustrates an exemplary track joint assembly 100 as may be found on track assembly 12. Track joint assembly 100 may include a first track shoe 102 having a one-piece shoe body, and including a ground pad 142 for engaging with a ground surface. First track shoe 102 may further include one or more backward pin lugs 144 for coupling first track shoe 102 to a second track shoe 104. Track shoe 102 may also include a forward pin lug 146 for coupling first track shoe 102 to another track shoe (not shown) opposite second track shoe 104. The terms "forward" and "back" and similar relative terms are used herein only for convenience, and should not be taken to mean a specific orientation within machine track 12. Analogously, the terms "first," "second," and similar are used for ease of description and do not require any particular ordering, arrangement, or other characteristic.

Second track shoe 104 may include a ground pad 150, similar to ground pad 142, for engaging with a ground surface. Second track shoe 104 may also include a forward pin lug 148 for coupling second track shoe 104 to first track shoe 102. Forward pin lug 148 may be identical to forward pin lug 146 and may be configured to nest between backward pin lugs 144. Like first track shoe 102, second track shoe 104 may have a one-piece shoe body and one or more forward pin lugs (not shown) identical to backward pin lugs 144. First track shoe 102, second track shoe 104, and any other track shoes connected thereto to form track assembly 12 may be substantially identical. Accordingly, discussion herein of any feature of one of track shoes 102 or 104 can be understood to refer by way of analogy to corresponding features of other track shoes.

First track shoe 102 and second track shoe 104 may be coupled together by a pin 120 (shown in FIG. 4) extending through a pin bore 106 defined by backward pin lugs 144 and forward pin lug 148. Pin bore 106 may be, for example, a cylindrical bore extending through all of backward pin lugs 144 and forward pin lug 148 when backward pin lugs 144 and forward pin lug 148 are aligned. The pin may likewise extend through all of backward pin lugs 144 and forward pin lug 148 such that each of first track shoe 102 and second track shoe 104 may pivot about the pin, and are prevented from decoupling from each other.

Figure 3:
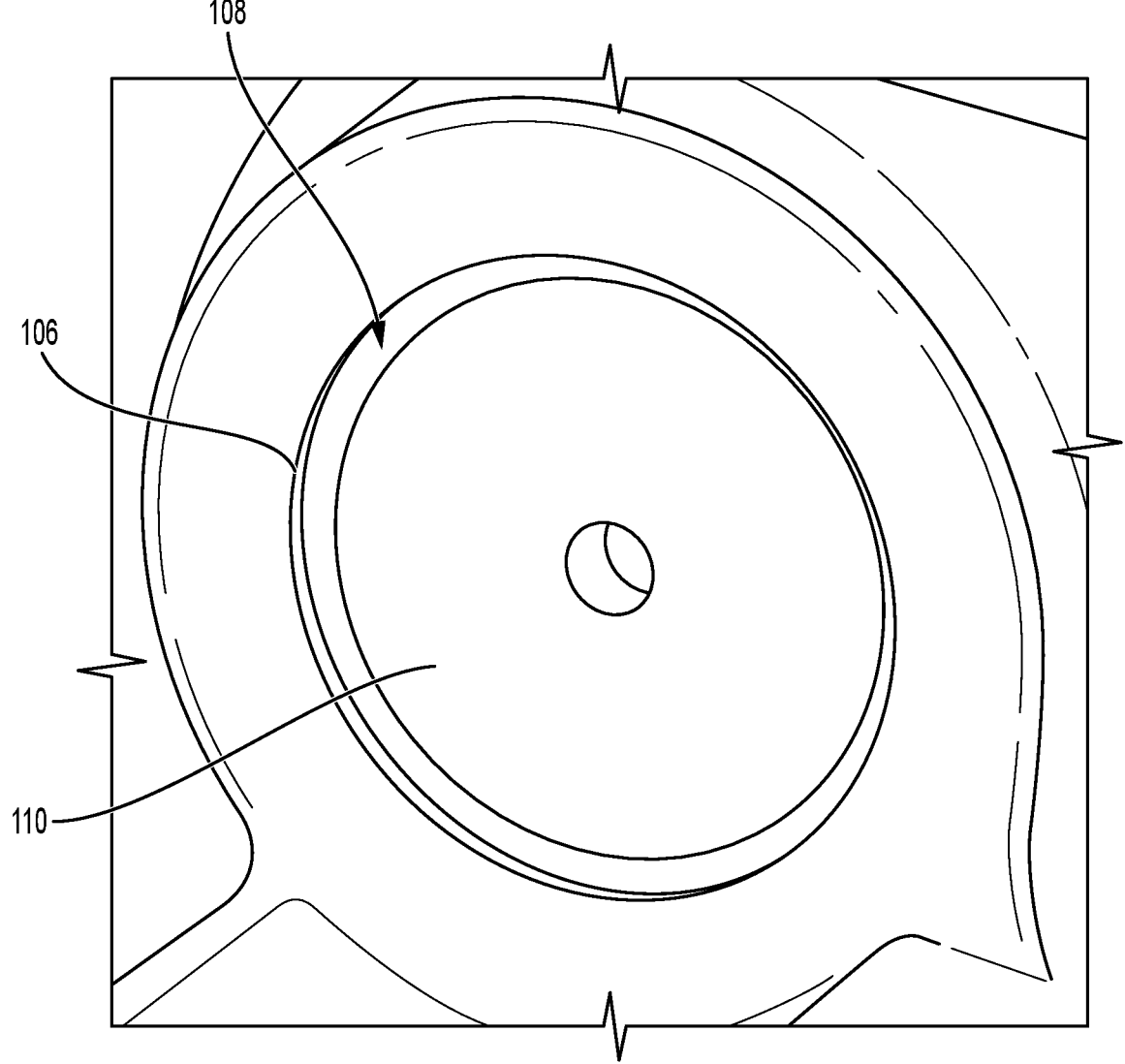
FIG. 3 is a close-up perspective view of the exemplary track joint assembly of FIG. 2.

As shown in greater detail in FIG. 3, pin 120 may be maintained within pin bore 106 by a retainer plate 110 positioned within pin bore 106 adjacent the pin. Retainer plate 110 may in turn be maintained within pin bore 106 by a stop ring 108. The configurations of retainer plate 110 and stop ring 108 will be discussed in greater detail hereinafter with reference to FIGS. 4-5.

It has been observed in certain known track systems that include pins, such as cartridge pins, and other types of pins, can "walk" out of their desired positions within pin bores over the course of a service life, necessitating field service of the track, requiring premature pin replacement, or causing other problems. Unsecured pins may indeed result in track shoes decoupling and a track effectively separating from a machine. As will be apparent from the following description, machine track 12, and track joint assembly 100 in particular, may be configured with unique and novel pin-retention mechanisms to address these and other undesired phenomena.

Figure 4:
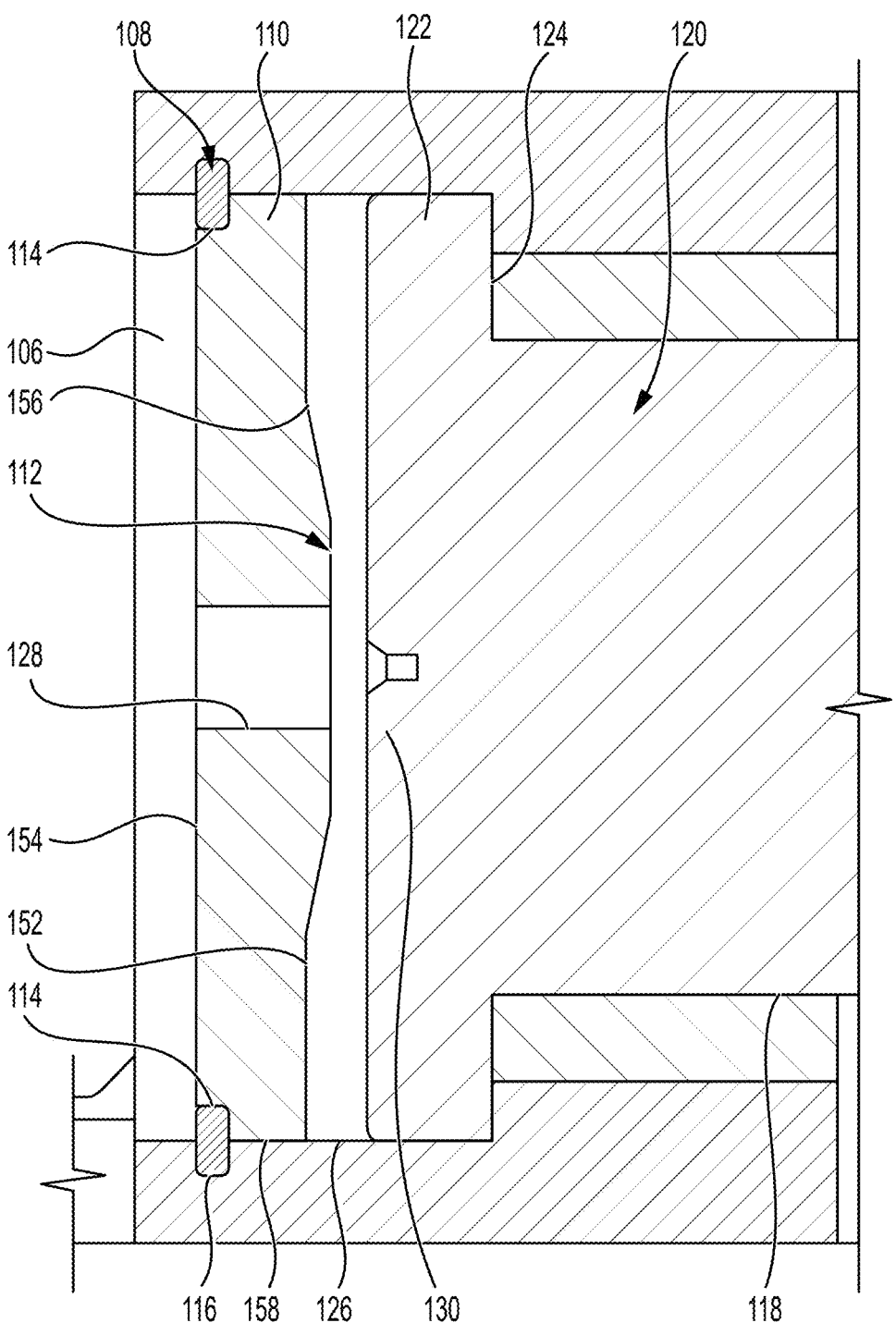
FIG. 4 is a cross-sectional view of the exemplary track joint assembly of FIG. 2.

FIG. 4 illustrates a cross-sectional view of pin bore 106 shown in FIGS. 2-3. Pin 120 may be positioned within pin bore 106 so as to couple first track shoe 102 and second track shoe 104. Pin 120 may include a pin body 118 and a pin head 130. Pin body 118 and pin head 130 may each be generally cylindrical. Pin body 118 may have a smaller diameter than pin head pin head 130 such that pin body 118 may be inserted into pin bore 106 without obstruction whereas pin head 130 may serve to prevent pin 120 from passing entirely through pin bore 106 and withdrawing from an opposite end of pin bore 106. For example, pin head 130 may include a flange 122 extending around an outer edge thereof. When pin 120 is inserted into pin bore 106, flange 122 may abut a corresponding shoulder 124 within pin bore 106, thereby preventing pin 120 from being inserted too far into pin bore 106 and/or withdrawing from an opposite end.

Retainer plate 110 may be positioned within pin bore 106 adjacent pin head 130 so as to inhibit pin 120 from "walking" out of pin bore 106. Retainer plate 110 may be generally disc-shaped and may have an outer diameter corresponding approximately to a diameter of inner surface 126 of pin bore 106. Retainer plate 110 may include an interior surface 152 adjacent pin head 130 and an exterior surface 154 opposite interior surface 152. Interior surface 152 and exterior surface 154 may each be at least partially planar and may be parallel to each other. Retainer plate 110 may also include outer circumferential surface 158 between interior surface 152 and exterior surface 154 and corresponding to inner surface 126 of pin bore 106.

A pin contact surface 112 may protrude from interior surface 152 toward pin head 130. Pin contact surface 112 may serve to contact pin head 130 with a surface area less than that of the entire interior surface 152 so as to concentrate force exerted by retainer plate 110 on pin 120, and vice versa, at central regions thereof. Pin contact surface may be generally circular in shape and may be surrounded by a frustoconical surface 156. Frustoconical surface 156 may serve as a transitional surface between interior surface 152 and pin contact surface 112.

Retainer plate 110 may further include a through-hole 128 extending through interior surface 152, exterior surface 154, and/or pin contact surface 112. Through-hole 128 may allow retainer plate 110 to flex slightly when urged by pin 120 and/or may allow access to pin 120 when retainer plate 110 is installed within pin bore 106.

Figure 6A:
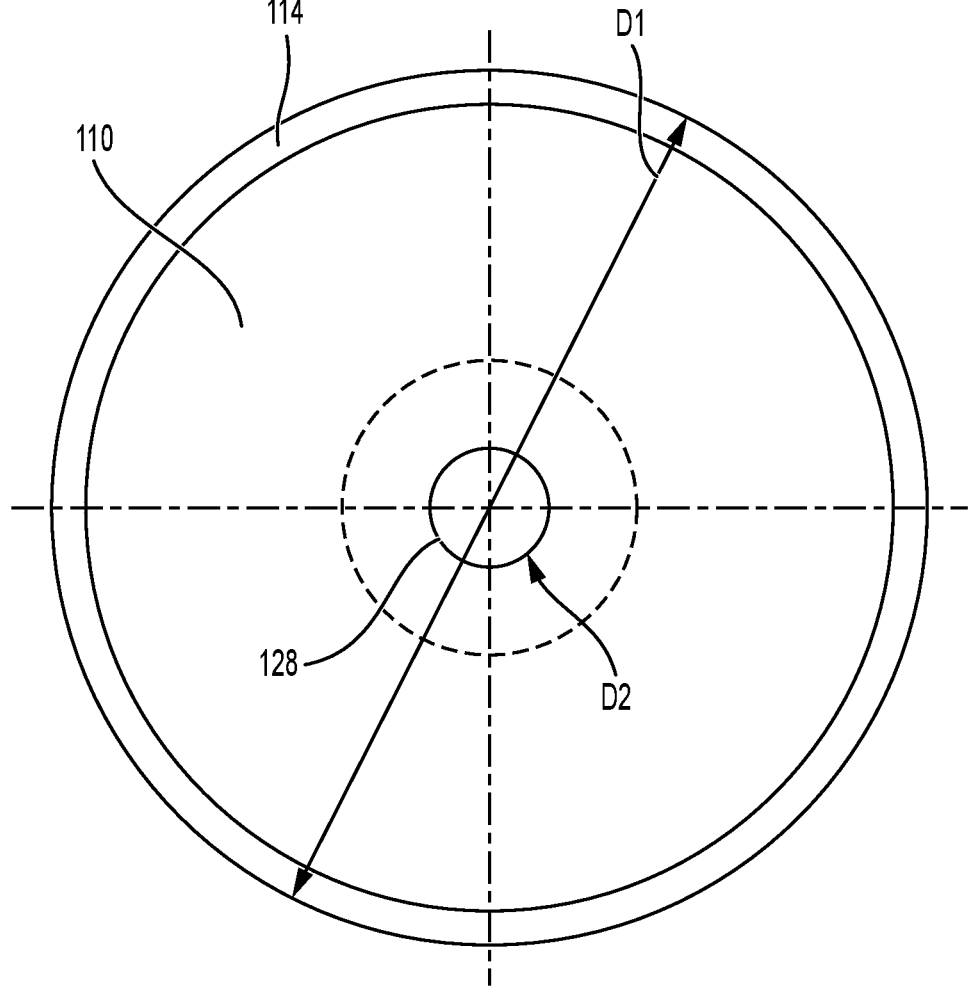
FIG. 6A is a front view of an exemplary retaining plate.

Retainer plate 110 may also include a recess 114 extending along an outer circumferential edge of exterior surface 154. In some embodiments, recess 114 may extend partially along a circumference of exterior surface 154 and in some embodiments recess 114 may extend along the entire circumference of exterior surface 154 such that recess 114 forms a complete circle (as shown in FIG. 6A). Recess 114 may be, for example, a step-shaped recess (i.e. a rebate or rabbet) or another shape suitable to the purposes described hereinafter.

Retainer plate 110 may be maintained within pin bore 106 by stop ring 108. Stop ring 108 may be approximately circular in shape. In some embodiments, stop ring 108 may be an incomplete circular shape and in some embodiments, stop ring 108 may be a complete circle. Stop ring 108 may be formed of an elastic material, such as spring steel, and may be compressible radially inwardly. For example, stop ring 108 may be a torsion spring. In some embodiments, stop ring 108 may be a circlip. Stop ring 108 may be positioned within a stop groove 116 formed in inner surface 126 of pin bore 106. Stop ring 108 may be of sufficient radial thickness such that stop ring 108 protrudes from stop groove 116 so as to block retainer plate 110 from withdrawing in an axial direction from pin bore 106.

As shown in FIG. 4, dimensions of recess 114 may be such that stop ring 108 may nest simultaneously within stop groove 116 and recess 114. When nested within stop groove 116 and recess 114, stop ring 108 may be inhibited by stepped circumferential surface 114a (shown in FIG. 5) of recess 114, from compressing radially inward. Stop ring 108 may thereby remain within stop groove 116 and continue to effectively block retainer plate 110 and pin 120 from withdrawing from pin bore 106.

By configuring retainer plate 110 so as to include recess 114, a tendency of stop ring 108 to compress radially inward may be minimized. For example, with retainer plates lacking recess 114, the present inventors recognized that forces exerted by pin 120 and the retainer plate on stop ring 108 may cause stop ring 108 to compress radially inward, thereby causing stop ring 108 to withdraw from stop groove 116. With stop ring 108 withdrawn from stop groove 116, each of stop ring 108, retainer plate 110, and pin 120 may be permitted to move axially within pin bore 106, potentially leading to pin 120 withdrawing from pin bore 106 and adjacent track shoes becoming decoupled. By preventing stop ring 108 from compressing, axial movement of the components may be significantly inhibited and a likelihood of failure of the track suppressed.

Figure 5:
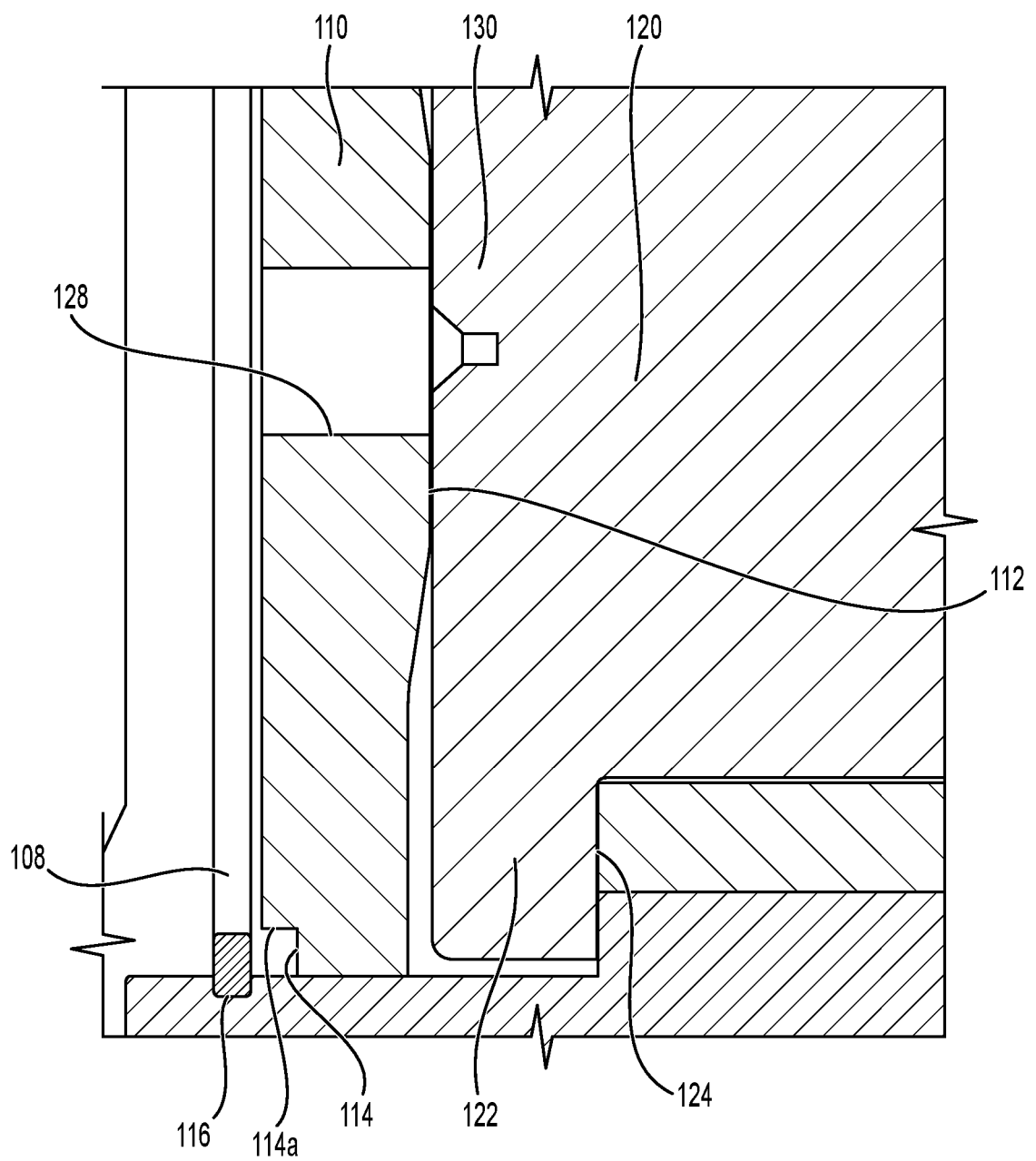
FIG. 5 is a cross-sectional view of the exemplary track joint assembly of FIG. 2 during installation of the retaining plate.

FIG. 5 represents another cross-sectional view of pin bore 106 and illustrates an exemplary positioning of retainer plate 110 that allows stop ring 108 to be positioned in stop groove 116 during installation and/or assembly. As shown in FIG. 5, pin 120 may already be positioned within pin bore 106 such that flange 122 abuts shoulder 124. Retainer plate 110 may be positioned within pin bore 106 such that pin contact surface 112 is in direct contact with pin head 130. It will be appreciated that track joint assembly 100 may be configured to allow an offset between pin contact surface 112 and pin head 130, as shown in FIG. 4.

While pin contact surface 112 is in direct contact with pin head 130, retainer plate 110 may be offset from stop groove 116 such that stop ring 108 may be radially compressed and inserted into pin bore 106 to a depth corresponding to stop groove 116. Stop ring 108 may be compressed radially, for example, manually, with a handheld tool such as pliers, or with any other suitable tool. Stop ring 108 may then be permitted to expand radially into stop groove 116. When stop ring 108 is nested within stop groove 116, retainer plate 110 may then be permitted to move away from pin head 130, such that recess 114 envelops stop ring 108. With stop ring 108 nested within recess 114, stop ring 108 may be inhibited from compressing radially inward by stepped circumferential surface 114a and thereby inhibited from withdrawing from stop groove 116.

Though pin 120 is shown in FIGS. 4 and 5 as including pin head 130, it will be understood that other types of pins may be used consistently with the present disclosure. For example, a straight pin without a head having a flange may be used. Additionally, FIGS. 4 and 5 show a mechanism for retaining pin 120 on only one side. It will be understood, however, that the retention mechanism described herein, including the retainer plate 110 and stop ring 108, may also be used on an opposite side of pin 120. Alternatively, a different retention mechanism may be used on an opposite side of pin 120.

Figure 6B:
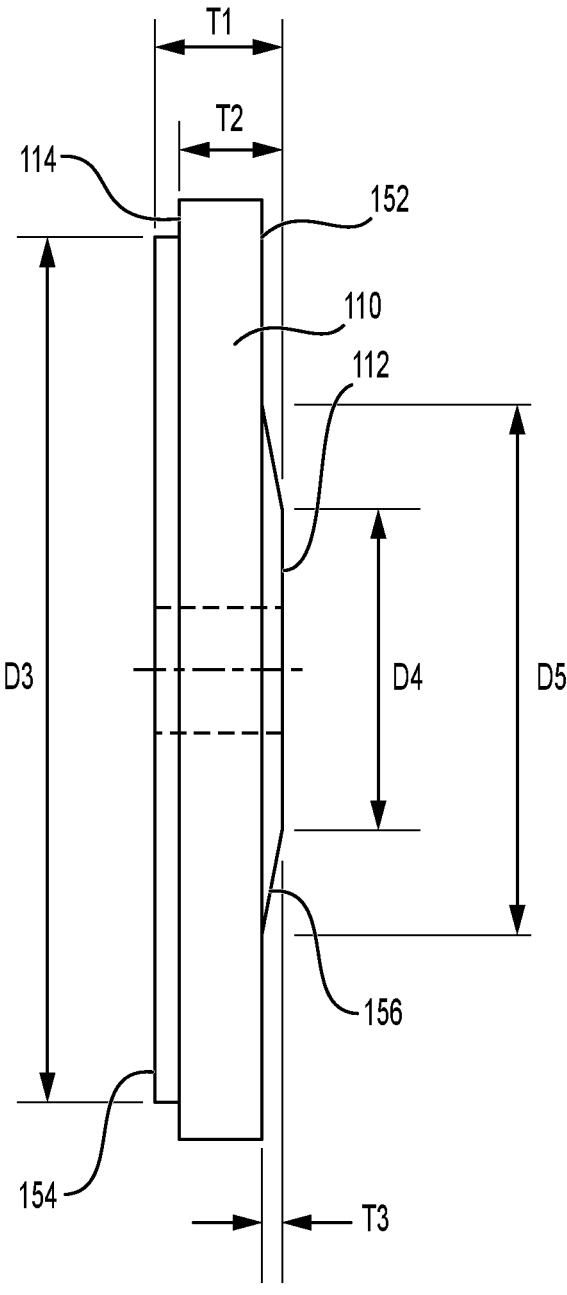
FIG. 6B is a side view of the exemplary retaining plate of FIG. 6A.

FIGS. 6A and 6B illustrate a plan view and side view, respectively, of retainer plate 110. As explained previously, retainer plate 110 may be substantially circular in shape and may have an outer diameter D1. In some embodiments, D1 may be between about 140 mm and about 170 mm. In some embodiments, D1 may be between about 150 mm and about 160 mm. In some embodiments, D1 may be 149.8 mm. In some embodiments, D1 may be 159.8 mm. Through-hole 128 may have a diameter D2. In some embodiments, D2 may be between about 15 mm and about 25 mm. In some embodiments, D2 may be about 20 mm.

As shown in FIG. 6B, stepped circumferential surface 114a may define a diameter D3. In some embodiments, D3 may be between about 130 mm and about 160 mm. In some embodiments, D3 may be between about 135 mm and about 150 mm. In some embodiments, D3 may be 137.9 mm. In some embodiments, D3 may be 147.9 mm. With reference to D1, D3 may be between about 90% and about 95% of D1. In some embodiments, D3 may be between about 92% and about 93% of D1.

Pin contact surface 112 may have an outer diameter D4. In some embodiments, D4 may be between about 40 mm and about 70 mm. In some embodiments, D4 may be between about 50 mm and about 60 mm. In some embodiments, D4 may be about 50 mm. In some embodiments, D4 may be about 60 mm. Frustoconical surface 156 may have an outer diameter D5. In some embodiments, D5 may be between about 80 mm and about 100 mm. In some embodiments, D5 may be between about 85 mm and about 95 mm. In some embodiments, D5 may be about 85 mm. In some embodiments, D4 may be about 95 mm.

Retainer plate 110 may have an overall thickness T1 measuring from exterior surface 154 to pin contact surface 112. In some embodiments, T1 may be about 18 mm to about 23 mm. In some embodiments, T1 may be about 20 mm to about 21 mm. In some embodiments, T1 may be about 20.3 mm. Retainer plate 110 may further have a thickness T2 measuring from recess 114 to pin contact surface 112. In some embodiments, T2 may be between about 14 mm to about 18 mm. In some embodiments, T2 may be about 16 mm. In some embodiments, a difference between T1 and T2 (i.e. a depth of recess 114) may be between about 18% and about 24% of T1. In some embodiments, a difference between T1 and T2 may be between about 20% and about 22% of T1. In some embodiments, a difference between T1 and T2 may be between about 3 mm and about 6 mm. In some embodiments, a difference between T1 and T2 may be 4.3 mm.

Pin contact surface 112 may protrude a distance T3 from interior surface 152. In some embodiments, T3 may be between about 2 mm and about 4 mm. In some embodiments, T3 may be about 3 mm.

It should be understood that specific dimensions discussed herein are exemplary in nature only and such dimensions may vary based on a particular machine on which retainer plate 110 is used or on other factors.

Figure 7:
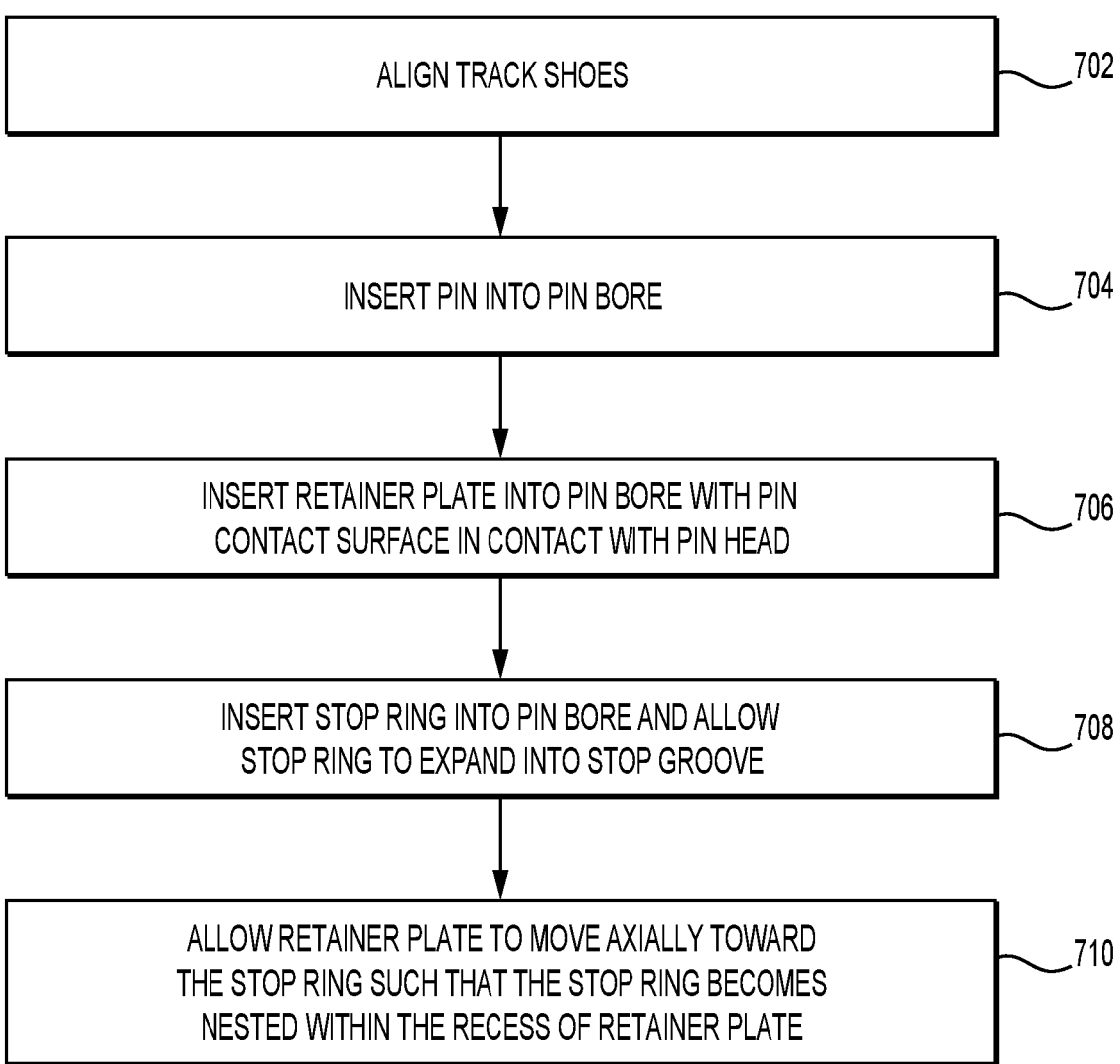
FIG. 7 is a flowchart illustrating a method of assembling a track joint assembly.

FIG. 7 depicts an exemplary method of assembling track joint assembly 100 described herein previously. At step 702, first track shoe 102 and second track shoe 104 may be aligned such that the one or more backward pin lugs 144 of first track shoe 102 and forward pin lug 148 of second track shoe 104 align to form pin bore 106. At step 704, once first track shoe 102 and second track shoe 104 are aligned, pin 120 may be inserted into pin bore 106 and advanced until flange 122 abuts shoulder 124.

At step 706, retainer plate 110 may be inserted into pin bore 106 with interior surface 152 facing pin head 130 of pin 120. Retainer plate 110 may be advanced until pin contact surface 112 comes into direct contact with pin head 130, as shown in FIG. 5. With pin contact surface 112 in contact with pin head 130, retainer plate 110 may be axially spaced apart from stop groove 116, thereby allowing access to stop groove 116 from a radially inward direction.

At step 708, stop ring 108 may be compressed radially from its equilibrium configuration and may be inserted into pin bore 106. Stop ring 108 may be advanced into pin bore 106 until stop ring 108 is positioned adjacent to stop groove 116. Stop ring 108 may then be permitted to expand radially so as to nest within stop groove 116. With stop ring 108 within stop groove 116, retainer plate 110 may be effectively blocked from withdrawing in an axial direction from pin bore 106.

At step 710, retainer plate 110 may be permitted to move axially within pin bore 106 toward stop ring 108 such that recess 114 envelops stop ring 108 and stop ring 108 becomes nested within stop groove 116 and recess 114. Retainer plate 110 may be permitted to move axially within pin bore 106 during normal operation of track assembly 12, or alternatively may be urged to move by inserting a tool into through-hole 128. Once retainer plate 110 moves and/or is moved, stop ring 108 may be inhibited from collapsing radially inward by stepped circumferential surface 114a. Stop ring 108 may consequently be inhibited from withdrawing from stop groove 116 and ceasing to block retainer plate 110 from withdrawing from pin bore 106. In effect, the configuration of track joint assembly 100 may be more reliable and an ability of track joint assembly 100 to remain in an assembled configuration, even during period of heavy use, may be improved.

The foregoing method may be repeated multiple times for adjacent track joint assemblies and as many times as necessary to form track assembly 12. Additionally, track joint assembly 100 may be disassembled by performing each of the foregoing steps in reverse—e.g. removing stop ring 108, removing retainer plate 110, removing pin 120, and separating track shoes 102 and 104.

In some embodiments, a kit including two or more of the components described herein may be provided. For example, retainer plate 110 and stop ring 108 may be provided in a kit for servicing an existing track assembly. In another example, a plurality of retainer plates 110 and stop rings 108 may be provided in a kit for assembling a track assembly. In still another example, a plurality of retainer plates 110, stop rings 108, and pins 120 may be provided in a kit for assembling a track assembly. In still another example, a plurality of retainer plates 110, stop rings 108, pins 120, and track shoes 102, 104 may be provided in a kit for assembling a track assembly.

INDUSTRIAL APPLICABILITY

The disclosed aspects of track joint assembly 100 may be used with a track assembly 12 and on any machine that includes a tracked undercarriage with links coupled together to form one or more tracks. Track joint assembly 100 and retainer plate 110 described herein may provide improved joint integrity, greater wear resistance, a longer service life, increased performance, a reduced risk of deformation, and a lower likelihood of requiring maintenance or replacement.

Additionally, it will be understood that any dimensions of track joint assembly 100 and/or retainer plate 110, and other aspects discussed herein, may be modified to accommodate different track assemblies 12 and/or machines.

As discussed previously, pin retention issues were associated with certain earlier designs, and pin displacement has created challenges to maintaining the integrity of track joints. In view of the teachings herein, it will be appreciated that configuring retainer plate 110 to include recess 114 such that stop ring 108 may nest within recess 114 may maintain retainer plate 110 and pin 120 at desired positions, inhibit walking of pin 120 out of place, and thereby inhibit adjacent track shoes from decoupling.

In particular, the configurations described herein may inhibit stop ring 108 from collapsing inward, which the inventors have identified as a source of failure in such track joint assemblies 100. During operation of a machine, adjacent track shoes of track assembly 12 may pivot about pin 120 as track assembly 12 is driven. Pivoting of the track shoes may result in forces being exerted on pin 120, such as friction forces, and including forces in an axial direction urging pin 120 out of pin bore 106. Such forces may translate to stop ring 108 via retainer plate 110 and may urge stop ring 108 to deform and collapse inwardly. By configuring retainer plate 110 as described herein, and in particular to include recess 114, collapsing of stop ring 108 may be effectively inhibited.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. A track joint assembly, comprising:
a first track shoe including at least one forward pin lug;
a second track shoe including at least one back pin lug;
a pin extending through a pin bore defined by the at least one forward pin lug and at least one back pin lug, coupling the first track shoe to the second track shoe;
a retainer plate positioned within the pin bore and including an interior surface adjacent the pin, an exterior surface opposite the interior surface, and a recess extending at least partially along an outer circumferential edge of the exterior surface;
a stop ring positioned within a stop groove formed in an inner circumferential surface of the pin bore, the stop ring positioned adjacent the exterior surface of the retainer and extending radially inward from the inner circumferential surface such that the stop ring blocks the retainer plate from withdrawing from the pin bore;
wherein the stop groove is positioned to permit axial translation of the retainer plate between the pin and the stop ring.

2. The track joint assembly of claim 1, wherein the stop ring is formed of a radially compressible elastic material.

3. The track joint assembly of claim 2, wherein the stop ring is located within the stop groove and the recess simultaneously, such that radial compression of the stop ring is inhibited by the retainer plate.

4. The track joint assembly of claim 3, wherein the stop ring is a circlip.

5. The track joint assembly of claim 1, wherein the retainer plate further includes an outer circumferential surface between the interior surface and the exterior surface having a first diameter; and wherein the recess defines a stepped circumferential surface having a second diameter smaller than the first diameter.

6. The track joint assembly of claim 5, wherein the stepped circumferential surface inhibits radial compression of the stop ring.

7. The track joint assembly of claim 1, wherein the retainer plate includes a pin contact surface protruding from the interior surface, wherein the pin contact surface is substantially parallel to the interior surface.

8. The track joint assembly of claim 7, wherein the pin contact surface has a first diameter, a head of the pin adjacent the pin contact surface has a second diameter, and the first diameter is smaller than the second diameter.

9. The track joint assembly of claim 8, wherein the retainer plate further includes a frustoconical surface defining a transition between the interior surface and the pin contact surface.

10. The track joint assembly of claim 9, wherein the retainer plate further includes a circular through-hole extending through the exterior surface and the pin contact surface.

11. A kit for a track joint assembly, comprising:

a stop ring dimensioned to fit within a stop groove formed in an inner circumferential surface of a pin bore; and a retainer plate configured to be positioned within the pin bore, the retainer plate including:

a planar first surface;

a planar second surface opposite the first surface;

an outer circumferential surface between the first surface and the second surface having a first diameter;

a recess extending at least partially along an outer circumferential edge of the first surface, wherein the recess defines a stepped circumferential surface having a second diameter smaller than the first diameter, wherein the stop ring is dimensioned to nest within the recess, and wherein the recess is shaped to inhibit collapsing of the stop ring when the stop ring is nested within the recess;

wherein the stop groove is positioned to permit axial translation of the retainer plate between a pin within the pin bore and the stop ring.

12. The kit for a track joint assembly of claim 11, further comprising:

a pin contact surface protruding from the second surface, wherein the pin contact surface is substantially parallel to the second surface.

13. The kit for a track joint assembly of claim 12, further comprising:

a frustoconical surface defining a transition between the second surface and the pin contact surface.

14. The kit for a track joint assembly of claim 11, further comprising:

a circular through-hole extending through the first surface and the second surface.

15. The kit for a track joint assembly of claim 11, wherein the second diameter is between about 90% and about 95% of the first diameter.

16. The kit for a track joint assembly of claim 11, wherein the second diameter is between about 92% and about 93% of the first diameter.

17. The kit for a track joint assembly of claim 11, wherein the first diameter is between about 140 mm and about 170 mm and the second diameter is between about 130 mm and about 160 mm.

18. The kit for a track joint assembly of claim 11, wherein the first surface is a first distance from the second surface, the recess has a first depth, and the first depth is between about 18% and about 24% of the first distance.

19. The kit for a track joint assembly of claim 11, wherein the first surface is a first distance from the second surface, the recess has a first depth, and the first depth is between about 20% and about 22% of the first distance.

20. A kit for a track joint assembly comprising:

a stop ring dimensioned to fit within a stop groove formed in an inner circumferential surface of a pin bore; and a retainer plate configured to be positioned within the pin bore, the retainer plate including:

a planar first surface;

a planar second surface opposite the first surface;

an outer circumferential surface between the first surface and the second surface having a first diameter; and a recess extending at least partially along an outer circumferential edge of the first surface, wherein the recess defines a stepped circumferential surface having a second diameter smaller than the first diameter, wherein the stop ring is dimensioned to nest within the recess, and wherein the recess is shaped to inhibit collapsing of the stop ring when the stop ring is nested within the recess;

wherein the second diameter is between about 90% and about 95% of the first diameter; and wherein the first surface is a first distance from the second surface, the recess has a first depth, and the first depth is between about 18% and about 24% of the first distance;

wherein the stop groove is positioned to permit axial translation of the retainer plate between a pin within the pin bore and the stop ring.

\* \* \* \* \*